L. C. Chase,

Halter Ring,

No. 1,514, Reissued July 28, 1863.

Witnesses.

Henry F. Chase

Charles E. Pearson.

Inventor

Lucius C. Chase

H. PETERS, PHOTO-LITHOGRAPHER, WASHINGTON, D. C.

UNITED STATES PATENT OFFICE.

LUCIUS C. CHASE, OF BOSTON, MASSACHUSETTS.

IMPROVEMENT IN HALTER-RINGS.

Specification forming part of Letters Patent No. 1,176, dated April 30, 1861; Reissue No. 1,514, dated July 28, 1863.

*To all whom it may concern:*

Be it known that I, LUCIUS C. CHASE, of Boston, in the county of Suffolk and Commonwealth of Massachusetts, have invented a new and useful Improvement in Halter-Rings; and I do hereby declare that the following is a full, clear, and exact description of the construction and operation of the same, reference being had to the accompanying drawings, forming a part of this specification, in which—

Figure 1:
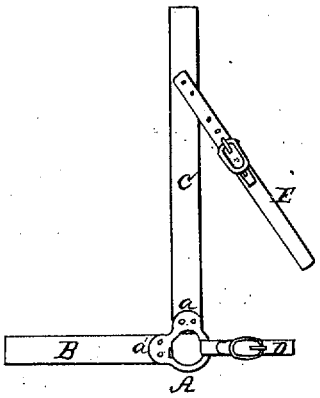
Figure 2:
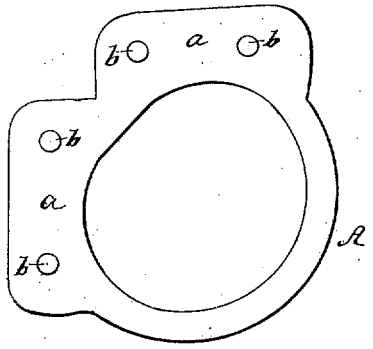
Figure 4:
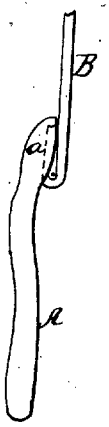
Figure 3:
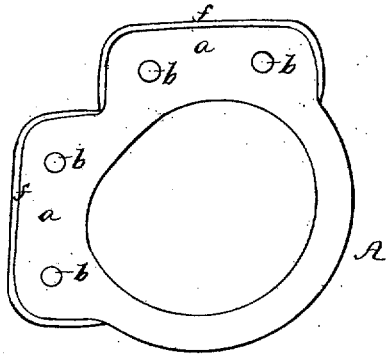

Figure 1 is a diminished side view of the ring attached to a halter; Fig. 2, an outside view of the ring, (full size;) Fig. 3, an inside view of the ring, showing the projecting rims *f f* on the flanges *a a*; and Fig. 4 is an edge view of the ring and one of the straps or bands turned over and united by rivets.

Like parts are indicated by the same letters in all the drawings.

The nature of my improvement consists, first, in attaching a halter-D or other harness-ring to a halter or harness strap by means of one or more rivets passing through holes in one or more flanges on said D or ring, whereby I not only save the labor of sewing and the expense of the leather or other material used to form the "lap" preparatory to sewing, but also produce a stronger, neater, and more durable article of its kind than any known or used before; second, in providing the edge of the flange or flanges *a* with a projecting rim or rims, *f*, so that the ends of the straps (especially woven straps) may be covered and protected by said rims, as hereinafter described.

To enable others skilled in the art to make and use my invention, I will now proceed to describe its construction and operation.

I make my rings of any suitable metal or material, but (for halters) instead of making them circular or in the form of the letter D, I shape them as represented in Figs. 2 and 3, the flanges *a a* being thinner than the other part of the ring. The inside of these flanges, that part on which are placed the ends of the straps, is flat, the outside being rounded on the edges and a little thicker than elsewhere round the rivet-holes *b*, which are either cast in or drilled.

*f f* are rims on the outer edges of the flanges *a a*, and project about one-eighth of an inch above the flat side of the same, their object being to cover and protect the ends of woven straps, which are doubled under as shown in Fig. 4, and keep them from raveling out. When leather straps are used, the rims may be wholly dispensed with or left only on the sides of the strap. It is also obvious that one or more flanges may be employed, and one or more rivets used, as required for different purposes.

Fig. 1 is a side view of the ring and halter, B being the nose-piece, C the head-piece, D the chin-strap, and E the throat-band. The ends of the straps or bands B and C, when of woven material, being doubled under (as shown in Fig. 4) and punched with holes corresponding to the holes *b*, are placed in the right position on the flanges, when broad-headed rivets are driven through the holes in the strap and flanges and riveted down on the outside of the latter.

The operation of constructing a halter is thus performed with great rapidity as compared with the usual method of attaching the straps to the ring, which is done by means of a broad strip of leather, shaped somewhat like the figure 8, passed through the ring, brought together so as to clasp the ends of B and C, and then sewed through.

The cost of my rings is but little more than that of those in general use, so that I not only actually save a large percentage of the labor in constructing a halter, but also the cost of the above-described broad strip of leather, which is used in the common method of attaching halter-D's. In other words, I save about ten cents per halter, or twenty per cent. of the whole expense. And not only this, but as there is nothing in my improvement to rip, crack, or chafe, I produce a stronger, more durable, and neater article than any known or used before.

It is also obvious that my method of attaching rings by means of rivets and flanges may be applied to advantage in the manufacture of all kinds of harness, whether of woven material or leather, for the purpose of saving sewing and stock, as well as producing a stronger and better article.

What I claim as new, and desire to secure by Letters Patent, is—

1. Attaching a halter-D or other harness-ring to a halter or harness strap by means of one or more rivets passing through holes in one or more flanges on said D or ring, substantially as set forth and for the purpose described.

2. Providing the edge of the flange or flanges *a* with the rim or rims *f*, substantially as described and for the purpose specified.

LUCIUS C. CHASE.

Witnesses:
N. AMES.
C. A. STEVENS.